US011359746B2

(12) United States Patent
Oldiges et al.

(10) Patent No.: US 11,359,746 B2
(45) Date of Patent: Jun. 14, 2022

(54) METHOD OF REPAIRING A LEAKING VALVE STEM

(71) Applicant: Whitmore Manufacturing, LLC, Rockwall, TX (US)

(72) Inventors: Donald A. Oldiges, Fate, TX (US); Tom Blake, Spring, TX (US); Rodney Roth, Cleveland, TX (US); Gregory Paul Bruckner, Washington, PA (US); Dennis Wayne Jones, III, Washington, PA (US)

(73) Assignee: Whitmore Manufacturing, LLC, Rockwall, TX (US)

( * ) Notice: Subject to any disclaimer, the term of this patent is extended or adjusted under 35 U.S.C. 154(b) by 0 days.

(21) Appl. No.: 16/875,083

(22) Filed: May 15, 2020

(65) Prior Publication Data

US 2020/0362989 A1    Nov. 19, 2020

Related U.S. Application Data

(60) Provisional application No. 62/848,288, filed on May 15, 2019.

(51) Int. Cl.
| | | |
|---|---|---|
| F16K 41/02 | (2006.01) | |
| C10M 111/04 | (2006.01) | |
| F16K 11/07 | (2006.01) | |
| C10N 10/04 | (2006.01) | |
| C10N 30/06 | (2006.01) | |

(52) U.S. Cl.
CPC ........... *F16K 41/02* (2013.01); *C10M 111/04* (2013.01); *F16K 11/0712* (2013.01); *C10M 2201/084* (2013.01); *C10M 2205/0225* (2013.01); *C10M 2205/0265* (2013.01); *C10M 2205/0285* (2013.01); *C10M 2209/1023* (2013.01); *C10M 2217/045* (2013.01); *C10N 2010/04* (2013.01); *C10N 2030/06* (2013.01)

(58) Field of Classification Search
CPC ................ F16K 41/02; C10M 111/04; C10M 2201/084; C10M 2205/0225; C10M 2205/0285; C10M 2209/1023; C10M 2217/045; C10M 2205/0265; C10N 2010/04; C10N 2030/06
USPC .......................................................... 106/33
See application file for complete search history.

(56) References Cited

U.S. PATENT DOCUMENTS

| | | |
|---|---|---|
| 3,262,952 A | 7/1966 | Smith |
| 5,052,427 A | 10/1991 | Butler et al. |
| 5,093,015 A | 5/1992 | Oldiges |
| 5,536,422 A | 7/1996 | Oldiges et al. |
| 6,960,555 B2 | 11/2005 | Anthony et al. |
| 7,091,161 B2 | 8/2006 | Oldiges et al. |
| 7,294,608 B2 | 11/2007 | Oldiges et al. |
| 9,303,808 B2 | 4/2016 | Miller et al. |
| 2003/0087768 A1 | 5/2003 | Florchinger et al. |
| 2004/0214732 A1* | 10/2004 | Oldiges ................ C10M 121/00 508/390 |
| 2009/0088353 A1* | 4/2009 | Berry ................... C10M 169/02 508/388 |
| 2011/0021391 A1* | 1/2011 | E .......................... C10M 169/00 508/165 |
| 2013/0109602 A1* | 5/2013 | Waynick .............. C10M 177/00 508/180 |
| 2014/0121139 A1* | 5/2014 | Waynick .............. C10M 135/10 508/162 |
| 2015/0252583 A1* | 9/2015 | Dvorak ................. E04H 13/003 52/103 |
| 2016/0244689 A9 | 8/2016 | Waynick |
| 2016/0272914 A1* | 9/2016 | Bardin ................. C10M 121/04 |
| 2019/0218470 A1* | 7/2019 | Karve .................. C10M 169/04 |
| 2019/0375998 A1* | 12/2019 | Tanaka ................. C10M 117/02 |
| 2020/0109345 A1* | 4/2020 | Zhang .................. C10M 117/04 |
| 2020/0199481 A1* | 6/2020 | Baum .................. C10M 115/10 |
| 2020/0231895 A1* | 7/2020 | Watanabe ............ C10M 117/00 |
| 2021/0277323 A1* | 9/2021 | Mayrhofer ........... C10M 107/32 |

FOREIGN PATENT DOCUMENTS

| | | |
|---|---|---|
| CA | 965768 A | 4/1975 |
| CA | 984819 A | 3/1976 |
| CA | 2523887 A1 | 11/2004 |
| CA | 2525561 A1 | 12/2004 |

OTHER PUBLICATIONS

PCT Search Report and Written Opinion in corresponding application PCT/US2020/033095, dated Aug. 27, 2020.
Jet-Lube Safety Data Sheet, "550® Extreme® All-Weather", Oct. 11, 2012.
Jet-Lube, "550 Extreme® Nonmetallic Anti-Seize Compound," Aug. 5, 2020.
Teadit North America, "Style 2236: Flexible Graphite with Inconel Wire Jacket Low Emission Packing API 622 Certified" www.teadit.com.
Bosman, R., et al., "The Microstructure of Calcium Sulfonate Complex Lubricating Grease and its Change in the Presence of Water", Taylor & Francis Group, LLC, Trilogy Transactions, Apr. 30, 2018 (https://doi.org/10.1080/10402004.2018.1431752).
European Patent Office, European Search Report, EP Application No. 20806385.9-1110/3953440, dated Apr. 22, 2022 (5 pages).

* cited by examiner

*Primary Examiner* — Ellen M Mcavoy
(74) *Attorney, Agent, or Firm* — John Wilson Jones; Jones Delflache LLP

(57) ABSTRACT

A non-curable injectable ester containing packing material for use in the repair of leaking valves contains a calcium sulfonate grease containing at least one polyalphaolefin, an ester, an anti-wear/anti-galling agent, a binding/thickening agent and a plasticizing agent.

20 Claims, No Drawings

METHOD OF REPAIRING A LEAKING VALVE STEM

This application claims the benefit of U.S. patent application Ser. No. 62/848,288, filed on May 15, 2019, herein incorporated by reference.

FIELD OF THE DISCLOSURE

The disclosure relates to an injectable packing material for use in the repair of leaking valves.

BACKGROUND

Valves controlling flow of fluids through pipes have moving parts which wear out or corrode over time causing the valves to fail. When this occurs, fluids and gases may leak from the valve. When used in conjunction with the routing of chemicals through conduits (such as in refineries, pipelines and storage facilities), leakage of fluids and gases through a faulty valve presents a loss of revenue through material loss as well as unsafe conditions and risks to the environment, even at low leakage levels measured in parts per million (ppm). Such conditions are of particular concern to those technicians responsible for the repair of the leaking valves.

Regulatory agencies responsible for inspecting industrial valves assure they are in compliance with air, water and worker safety standards. With aging equipment and increasing regulatory oversight the necessity for leak elimination and valve repair is growing rapidly.

When a valve begins to leak in an industrial plant, the specific plant process may have to be taken out of service. The costs for plant down-time may extend into the millions of dollars and fines from regulatory agencies, such as the EPA, can add substantially to the increased costs. To prevent down-times, it is desirable for the valve leak to be repaired while the industrial plant is in-service and under standard operating parameters. To accomplish this task, service technicians use a drill and tap procedure wherein a hole is partially drilled through the valve housing near the gland packing, the hole is threaded, and a fitting is then screwed through the hole. Injectable replacement packing is then introduced into the hole.

In the past, valve packing replacements have exhibited a number of problems. For example, they often contain volatile organic compounds (VOCs) which are further subjected to environmental regulations. Accordingly, there is a need for a valve packing replacement material which is void of VOCs. Further, it is desirable for such valve packing replacement materials to be odorless or have a low odor not detected on hydrocarbon monitoring sniffers.

Another issue seen with current valve packing replacement materials is the inability for them to be re-used after operations are resumed and VOC leakage levels exceed permissible limits. Typically, this is the resultant of these replacements hardening once inserted into the valve being subject to repair. If leaks develop after their installation, either a new valve needs to be installed or a second drill and tap procedure must be conducted. Second drill and tap procedures are much more difficult than a first drill and tap. For instance, the technician drill in an incorrect position and the injection of the valve packing repair material will be ineffective. In addition, second drill and tap procedures subject the technician to a higher risk of exposure to leaked VOCS such as when the technician drills too deep into the bell housing. Accordingly, it is desirable to have a valve packing replacement material that can be re-used without requiring a second drill and tap procedure.

SUMMARY

In an embodiment, the disclosure relates a valve packing repair composition comprising (a) sulfonate complex grease said grease complex containing a polyalphaolefin (and typically an ester), (b) an anti-wear/anti-galling agent or agents, (c) a binding/thickening agent or agents, and (d) a high molecular weight plasticizing agent, wherein the plasticizing agent is miscible with the sulfonate complex grease.

In another embodiment, the disclosure relates to a valve packing repair composition comprising (a) a calcium sulfonate complex grease said grease complex including esters, (b) an anti-wear/anti-galling agent selected from the group consisting of graphite, antioxidant treated flexible graphite, molybdenum disulfide, tungsten disulfide, mineral carbonate, mineral silicates, mineral fluorides, mineral oxides and mixtures thereof, (c) a binding/thickening agent selected from the group consisting of silica, organophilic clay, and powdered metallic soaps and mixtures thereof, and (d) a high molecular weight plasticizing agent including an isocyanate reaction product of castor oil or a diglycol ester of a dibasic acid, wherein the plasticizing agent is miscible with the calcium sulfonate complex grease because the ester of the complex grease is miscible with the plasticizing agent.

In another embodiment, the disclosure relates to a valve packing repair composition comprising (a) from about 20 to about 60 w/w % calcium sulfonate grease complex including esters, (b) from about 20 to about 50 w/w % anti-wear/anti-galling agent, (c) from about 5 to about 20 w/w % binding/thickening agent, and (d) from about 2 to about 20 w/w % plasticizing agent, wherein the plasticizing agent is miscible with the calcium sulfonate complex grease.

In another embodiment, the disclosure relates to a valve packing repair composition comprising (a) from about 30 to about 60 w/w % calcium sulfonate grease complex including esters, (b) from about 30 to about 50 w/w % anti-wear/anti-galling agent, (c) from about 5 to about 15 w/w % binding/thickening agent, (d) from about 2 to about 10 w/w % plasticizing agent, wherein the plasticizing agent is miscible with the calcium sulfonate complex grease.

In another embodiment, the disclosure relates to a valve packing repair composition comprising (a) from about 35 to about 45 w/w % calcium sulfonate grease complex including esters, (b) from about 40 to about 45 w/w % anti-wear/anti-galling agent, (c) from about 10 to about 15 w/w % binding/thickening agent, and (d) from about 2 to about 8 w/w % plasticizing agent, wherein the plasticizing agent is miscible with the calcium sulfonate complex grease.

In another embodiment, the disclosure relates to a valve packing composition comprising (a) a calcium sulfonate complex grease comprising at least one polyalphaolefin and at least one ester, (b) at least one anti-wear/anti-galling agent, (c) at least one binding/thickening agent, and (d) a plasticizing agent miscible with the ester of the calcium sulfonate complex grease.

In another embodiment, the disclosure relates to a valve packing composition comprising (a) a calcium sulfonate complex grease comprising calcium sulfate dispersed in an oil, the oil comprising at least one polyalphaolefin and at least one ester, (b) at least one anti-wear/anti-galling agent, (c) a binding/thickening agent, and (d) a plasticizing agent comprising a reaction product of an isocyanate and castor oil or a diglycol ester of a dibasic acid. The ester of the base oil is miscible with the plasticizing agent and the plasticizing agent is miscible with the calcium sulfonate complex grease.

In another embodiment, the disclosure relates to a valve packing repair composition comprising (a) a calcium sulfonate complex grease having at least one polyalphaolefin; (b) at least one anti-wear/anti-galling agent; (c) at least one binding/thickening agent; (d) an ester; and (e) a plasticizing agent.

In another embodiment, a method of repairing a leaking valve stem is provided wherein the leaking valve stem is drilled and tapped, the composition of any of the paragraphs above is injected into the valve stem and the valve stem is then closed.

The present disclosure includes features and advantages which are believed to enable advancement of repair of leaking valves. Characteristics and advantages of the present disclosure described above, and additional features and benefits will be readily apparent to those skilled in the art upon consideration of the following detailed description of various embodiments.

DETAILED DESCRIPTION

The following description provides specific details, such as material types, compositions, and process parameters for a thorough description of the following embodiments of the disclosure. Characteristics and advantages of the present disclosure and additional features and benefits will be readily apparent to those skilled in the art upon consideration of the exemplary embodiments of the present disclosure. It should be understood that the description herein, being of exemplary embodiments, is not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to."

Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The use of the terms "a" and "an" and "the" and similar referents in the context of describing the invention (especially in the context of the following claims) are to be construed to cover both the singular and the plural, unless otherwise indicated herein or clearly contradicted by context.

All ranges disclosed herein are inclusive of the endpoints. A numerical range having a lower endpoint and an upper endpoint shall further encompass any number and any range falling within the lower endpoint and the upper endpoint. For example, every range of values (in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

The suffix "(s)" as used herein is intended to include both the singular and the plural of the term that it modifies, thereby including at least one of that term (e.g., the polyalphaolefin(s) includes at least one polyalphaolefin). "Optional" or "optionally" means that the subsequently described component or event can or cannot occur. As used herein, "combination"" is inclusive of blends, mixtures, reaction products, and the like.

All references are incorporated herein by reference.

A valve which develops a leak may be repaired with the valve repair packing material disclosed. The material comprises a composition of a calcium sulfonate complex grease containing at least polyalphaolefin, at least one anti-wear or anti-galling agent, at least one binding/thickening agent and at least one plasticizing agent. The calcium sulfonate complex grease typically contains an ester. Alternatively, an ester may be added to a calcium sulfonate complex grease containing a polyalphaolefin along with the anti-wear or anti-galling agent, binding/thickening agent and plasticizing agent.

The amount of calcium sulfonate complex grease in the composition is usually between from about 20 to about 60 w/w %, typically from about 30 to 60 w/w % and more typically from about 35 to about 45 w/w %. The amount of anti-wear or anti-galling agent in the valve repair packing composition is usually between from about 20 to about 50 w/w %, typically from about 30 to 50 w/w % and more typically from about 40 to about 45 w/w %. The amount of binding/thickening agent in the valve repair packing composition is usually between from about 5 to about 20 w/w %, typically from about 5 to 15 w/w % and more typically from about 10 to about 15 w/w %. The amount of plasticizer in the valve repair packing composition is usually between from about 2 to about 20 w/w %, typically from about 2 to 10 w/w % and more typically from about 2 to about 8 w/w %.

The valve repair packing composition does not readily decompose upon exposure to sustained high pressure and high temperature conditions. Further, the valve repair packing composition is insoluble in water. It may easily be applied and also adheres to galling prone alloys such as valve gates or stems. In addition, the valve repair packing composition is compatible with both mechanical and traditional stem packing materials. The valve repair packing composition further may exhibit corrosion/rust resistance.

The valve repair packing composition may be subjected to continuous, periodic or intermittent contact with fluids and gases under harsh conditions in conduits. Such conduits include those used in various oil pipeline applications. In addition to withstanding such harsh physical parameters as high temperatures, pressures and excessive friction, the valve repair packing composition exhibits excellent resistance to degradation and decay from the actions of water and hydrocarbons.

Since the valve repair packing composition does not readily decompose when exposed to high pressures and high temperatures, it has particular applicability in the repair of valve stems in oil and gas wells, water wells and refineries as well as in mining applications. Further, the repair packing composition is injectable and easily applied into the valve to be repaired by a drill and tap procedure using standard injection protocols.

The valve repair packing composition is pliable and exhibits a structure of fibrous grease having the consistency of putty. It may be characterized as a semi-plastic having the properties of Table I:

TABLE I

| Property | Range |
|---|---|
| Dropping Point, ASTM D-2265 | None |
| Specific gravity | 1.46 |
| Density, ppg, (BYK-Gardner wt./gal cup) | 12.16 |
| Std. Test Method for Oil Separation from Lubricating Grease (ASTM D-6184) | <1 |
| Wt. % Loss @ 212° F. (100° C.) | NIL |
| Flash point (ASTM D-92) | 500° F. |
| NLGI Grade | 6 |
| Consistency or penetration @ 77° F., ASTM D-217) | 75-95 |
| K-Factor (ASME PCC-1, Appendix J) | 0.15 |
| Copper Strip Corrosion (ASTM D-4048) | 1A |
| Salt Fog Resistance (ASTM B-117) (20% NaCl @ 100° F. Hrs. free of Corrosion | 500 |

Typically, the grease is used in a stick form.

The calcium sulfonate complex grease of the valve repair packing composition may be a calcium over-based sulfonate in a base oil. The base oil may comprise a lubricating oil and a polyalphaolefin oil (PAO).

The valve repair packing composition further contains an ester. The ester is typically included with the polyalphaolefin in the base oil in the calcium sulfonate complex grease. In such cases, the amount of ester in the combined PAO oil and ester is from about 5 to about 65% by weight.

In an embodiment, the calcium sulfonate complex grease comprises between from about 55 to about 95% by weight of the combination of the base oil and between from about 5 to about 40% by weight of calcium sulfonate. Typically, between from about 40 to about 60% by weight of the total lubricating oil and PAO/ester comprises the PAO/ester.

Suitable lubricating oils may be a petroleum fluid or other fluid such as a petroleum-based oil like a naphthenic or paraffinic oil or mineral oil or a vegetable oil or a combination thereof. Exemplary mineral oils include white mineral oils especially a Group II or III white mineral oil (greater than 90 percent saturates) such as those sold by Crompton Chemical Corporation, Citgo, Lyondell Chemical Company, PSI, and Penreco. Suitable vegetable oils include castor oils, corn oil, olive oil, sunflower oil, sesame oil, peanut oil, soybean oil, canola oil, palm oil, rape seed oil and jojoba as well as modified vegetable oils such as crosslinked castor oils and combinations thereof. Preferred animal oils include, without limitation, tallow, mink oil, lard, other animal oils, and combinations thereof.

In a preferred embodiment, the lubricating oil may be a synthetic oil such as a silicon oil, glycol or a vegetable oil such as soybean oil, canola oil, palm oil, rape seed oil, jojoba, etc. In a preferred embodiment, the lubricating oil may be a food grade oil, such as a H1 or H2 food grade (Group 2 or Group 3) oil. H2 food grade oils may be preferred. In an embodiment, the calcium sulfonate may be dispersed in the PAO/ester as well as in the lubricating oil.

In an embodiment, the calcium sulfonate complex grease comprises calcium sulfonate in a base oil of only the PAO and the ester. In other words, the calcium sulfonate complex grease may not contain the lubricating oil referenced above. In such instances, the total amount of the combination of PAO and ester in the calcium sulfonate complex grease is between from about 60 to about 95% by weight.

The calcium sulfonate complex grease may be prepared by several different methods. In one method, calcium sulfonate or calcium sulfonate soap and calcium hydroxide may be mixed with the base oil. In another method, a calcium sulfonate precursor such as calcium hydroxide, calcium oxide or calcium carbonate may be mixed with a sulfonated material having a molecular weight from 280 to 800 to make calcium sulfonate in situ in the presence of the base oil.

During the process, the overbased calcium sulfonate soap or the calcium sulfonate reaction product may form a colloidal dispersion of inverse micelles comprising the amorphous calcium source (such as calcium carbonate), typically having a size of in the oil and stabilized by the calcium sulfonate. In such instances, a weak organic acid such as one having a $C_{12}$ to $C_{30}$ hydrocarbon like stearic acid or stearic acid derivative (such as 12-hydroxystearic acid) may be used a complexing agent to form sulfonated anion engaged with the calcium cations to form a spherical micellular structure. The micelles consist therefore of the calcium carbonate and calcium sulfonate of the fatty acid. (The term overbased is used to describe the excess of calcium metal over that required to neutralize sulfonic acid during the process.)

In another embodiment, the calcium sulfonate complex may be a commercial lubricating oil. In an embodiment, the PAO (and ester) may be added to the commercial lubricating oil. In another embodiment, the commercial lubricating oil could contain a PAO and the ester may be added to the commercial lubricating oil. For instance, the lubricating oil may be of the MIL G-6032 gasoline resistant plug valve lubricant type or other commercially available sulfonate greases for industrial lubrication, such as those lubricant described in U.S. Pat. Nos. 5,308,514; 4,560,489; 5,126,062 and 5,338,467 which contain a lower percentage of thickener with more oil. Alternatively, a commercial calcium sulfonate grease such as those sold by Phillips, ExxonMobil, American Refining (Kendall), Whitmore, Century, Sinclair Oil Corp. and Royal Lubricants (Royco) may be used. The solubility parameters of the commercial grease must be such that the other components of the composition may be incorporated and further provided the commercial grease under in-situ conditions is not de-gelled or cause phase separation of the other components of the grease.

The calcium sulfonate complex grease exhibits a melting point which typically is between from about 320° F. to >650° F., more typically from about 450° F. to about 600° F. The high melting point of the calcium sulfonate complex grease may be attributable to the critical balance of the calcium salt (such as calcium carbonate) in a micellular form (as well as other calcium salts) with calcium sulfonate.

Further, the calcium sulfonate complex has a dropping point over 500° F. and a total base number (TBN) ranging from about 300 to about 500 mg KOH/gm (the TBN being a measurement of alkaline reserve, i.e., the number of mg of KOH equivalent to the amount of acid required to neutralize the alkaline constituents present in 1 g of the complex).

The calcium sulfonate complex may also be a major factor in resistance to degradation of the calcium sulfonate complex grease under harsh in-situ conditions.

The combination of ester and PAO enhances the stability of the valve packing material when it is subjected to in-situ (high or low) excessive temperatures. The presence of the ester in the composition not only improves compatibility of the valve repair packing material with the original (damaged) packing which is being repaired but further provides the requisite solubility/miscibility parameters for incorporation of the plasticizer. Further, the ester enables solubility of the other additives in the valve repair packing material.

In an embodiment, the PAO has a viscosity of 8 to 60 centistokes at 100° C. Such viscosity range may be a straight cut of PAO or a PAO/ester blend. Alternatively, other materials may be included in the base oil so as to enable the requisite 8 to 60 centistokes viscosity at 100° C. such as olefins or acrylate polymers. This may be necessary in those instances where the ester exhibits a viscosity less than 8 centistokes at 100° C. Such materials may include a supplement fluid such as a petroleum fluid such as a paraffinic hydrocarbon (such as one of petroleum origin), mineral oils, vegetable oils and animal oils. While such materials may be used as an alternative to the PAO, calcium sulfonate complex greases using such materials typically are not sufficiently viscous or contain levels of volatile chemicals capable of triggering sniffer instruments. When present, the amount of such materials is typically no more than about 1 to about 14, more typically no more than about 2 to about 10, weight percent of the combination of PAO/ester and supplement oil.

Suitable as PAO include, without limitation, polyethylenes, polypropylenes, polybutenes, polyisobutenes, polypentenes, polyisopentenes, polyhexenes, polyisohexenes, polyheptenes and polyisoheptenes as well as copolymers of ethylene, propylene, butylene, isobutylene, pentene, isopentene, heptane, iso-heptene as well as combinations thereof. Preferred as PAO include those sold by ExxonMobil Chemical Company as SHF fluids, by Albemarle Corporation under the name ETHYLFLO and Durasyn. Such fluids include those specified as ETYHLFLO 162, 164, 166, 168, 170, 174, and 180. Particularly preferred as PAO include bends of about 56% of ETHYLFLO now Durasyn 174 and about 44% of ETHYLFLO now Durasyn 168. Preferred polybutenes include, without limitation, those sold by BP/Amoco Chemical Company and Exxon Chemical Company under the trade names INDOPOL and PARAPOL, respectively. Particularly preferred polybutenes include BP Amoco's INDOPOL 100.

In an embodiment, the ester may be the reaction product of a diol or a polyol having about 3 to 20 hydroxyl groups and an aliphatic acid having about 1 to 24 carbon atoms. Examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol. Examples of the polyol include polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (composed of 2 to 20 glycerin molecules), 1,3,5-pentanetriol, sorbitol, sorbitan, a sorbitol glycerin condensate, adonitol, arabitol, xylitol, and mannitol; and saccharides such as xylose, arabinose, ribose, rhamnose, glucose, fructose, galactose, mannose, sorbose, cellobiose, maltose, isomaltose, trehalose, sucrose, raffinose, gentianose, and merenditose, and partially etherified products and methyl glucosides of the saccharides. Of those, a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is typically preferred as polyol.

The aliphatic acid may have any number of carbon atoms without any particular limitation; an aliphatic acid having 1 to 24 carbon atoms is typically used. Of the aliphatic acids each having 1 to 24 carbon atoms, an aliphatic acid having 3 or more carbon atoms is preferred, an aliphatic acid having 4 or more carbon atoms is more preferred, an aliphatic acid having 5 or more carbon atoms is still more preferred, and an aliphatic acid having 10 or more carbon atoms. In addition, an aliphatic acid having 18 or less carbon atoms may be preferred, an aliphatic acid having 12 or less carbon atoms is more preferred, and an aliphatic acid having 9 or less carbon atoms is still more preferred.

In addition, the aliphatic acid may be a straight-chain aliphatic acid or a branched aliphatic acid; the aliphatic acid is preferably a straight-chain aliphatic acid in terms of lubricity or is preferably a branched aliphatic acid in terms of hydrolytic stability. Further, the aliphatic acid may be a saturated aliphatic acid or an unsaturated aliphatic acid.

Examples of the aliphatic acid include: include straight-chain or branched pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and oleic acid; or a neoic acid of which the alpha-carbon atom is quaternary. More specifically, valeric(n-pentanoic) acid, caproic(n-hexanoic) acid, enanthic(n-heptanoic) acid, caprylic(n-ocatanoic) acid, pelargoic(n-nonanoic) acid, capric(n-decanoic) acid, oleic(cis-9-octadecenoic) acid, isopentanoic(3-methylbutanoic) acid, 2-methylhexanoic acid, 2-ethylpentanoic acid, 2-ethylhexanoic acid, and 3,5,5-trimethylhexanoic acid are preferred.

In an embodiment, the ester may be a partial ester in which some of the hydroxyl groups of a polyol remain without being esterified, may be a complete ester in which all of the hydroxyl groups of the polyol are esterified, or may be a combination of a partial ester and a complete ester.

In a preferred embodiment, the ester is prepared from a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is more preferred, and an ester of neopentyl glycol, trimethylolethane, trimethylolpropane, trimethylolbutane, or pentaerythritol is still more preferred because such ester is additionally excellent in hydrolytic stability. An ester of pentaerythritol may also be preferred.

Specific examples of esters include a diester of neopentyl glycol and one or more aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylol ethane and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylol propane and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5, 5-trimethylhexanoic acid; a triester formed of trimethylol butane and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a tetraester formed of pentaerythritol and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5, 5-trimethylhexanoic acid.

Esters with two or more aliphatic acids may be a combination of two or more esters formed of one aliphatic acid and a polyol. An ester formed of two or more (mixed) aliphatic acids and polyol, particularly an ester formed of mixed aliphatic acids and a polyol may also be preferred.

In a most preferred embodiment, the ester may be a polyolester such as esters of neopentyl glycols, trimethylolpropanes, pentaerythriols, dipentaerythriols, and diesters such as dioctylsebacate (DOS), diactylazelate (DOZ), and dioctyladipate.

The binding/thickening agent serves as a thickener to maintain the viscosity of the valve repair packing material and thus the stability of the valve repair packing material. Further, it may serve to bind the components of the material together as well as aid in the biodegradability of the oil of the calcium sulfonate complex grease upon degradation of the valve repair packing material under in-situ conditions.

Suitable binding/thickening agents include silica (including fumed silica), an organophilic clay (such as bentonite), urea and metallic soaps. The metallic soap is preferably a lithium, calcium, zinc or aluminum soap, more preferably a calcium or aluminum soap. It may be commercially available or prepared by neutralization of a weak fatty acid with the metallic hydroxide, or alkali. Suitable weak fatty acids include those having a $C_{16}$ to $C_{18}$ carbon chain, like stearic acid and stearic acid derivatives such as 12-hydroxystearic acid, Powdered forms of the metallic soaps can also be used and are often useful as extrusion aids during manufacturing of the valve packing composition. Further, such binding/thickening materials are not only effective in maintaining the requisite viscosity of the valve repair packing composition but also may aid it biodegradability which may ultimately be caused by the hydrolytic breakdown of the ester or PAO. The binding/thickening agents may also provide a better aesthetic extrusion appearance. In addition, they can build up on the packing gland to aid in repair of the valve leak.

The valve repair packing composition may further contain an anti-wear or anti-galling agent for preventing seizing and galling in the harsh environmental conditions to which it is exposed. Preferred are those agents capable of reducing friction of metallic surfaces and metallic parts up to 750° F. while demonstrating lubricity and use on such surfaces and parts. Suitable anti-galling agents include graphite, molybdenum disulfide, tungsten disulfide, lead sulfide, mineral oxides such as zirconium oxide, cerium oxide, calcium oxide, nickel oxide, zinc oxide, tin oxide, magnesium oxide or hydroxide, aluminum oxide, titanium dioxide, iron oxides and yttrium oxide and mineral fluorides such as calcium fluoride, barium fluoride and graphite fluorides, mineral carbonates such as carbonates of alkali metals or alkali earth metals such as calcium carbonate, magnesium carbonate and sodium carbonate, dolomite, mineral silicates such as mica and metallic silicates of the formula $M_xO_ySiO_2$ (wherein M is an alkali metal or an alkali earth metal), carbides (such as silica carbide and titania carbide and nitrides such as boron nitrides, titanium nitride, aluminum nitride and silica nitride as well as organic molybdenum compounds such as molybdenum alkyl thiophosphates, molybdenum alkyl thiocarbamates as well as combinations thereof. Preferred anti-wear/anti-galling agents may be those selected from the group consisting of graphite, expanded and antioxidant treated graphite, molybdenum disulfide, tungsten disulfide, mineral carbonates, mineral silicates, mineral fluorides, mineral oxides and combinations thereof.

The graphite may be individual or blends of conventional graphite, amorphous or flake graphite or an expanded and antioxidant treated graphite processed to meet defined physical parameters when combined with any expanded and antioxidant treated graphite in a commercial calcium sulfonate complex. The graphite is generally capable of absorbing or holding oil and grease based upon surface morphology such as fiber-like edges.

In a preferred embodiment, the anti-galling agent is at least one selected from the group consisting of graphite, expanded graphite and engineered graphites, such as those manufactured from purified natural flakes expanded under heat and optionally then compressed into continuous sheeting, preferably containing no fillers or binders. Exemplary engineered graphites may include those which exhibit enhanced surface area and high temperature resistance, such as Sigraflex@ APX2 and ULT from Kybon Corp. of Russia. Preferred anti-galling agents include flexible graphites. In an embodiment, the engineered graphite may be characterized as a graphite foil having a compressibility index, ASTM F36, from 30 to 50, and a tensile strength, ASTM F162, from 400 to 600 psi further processed through a jet mill to attain the determined particle size range of <1 to about 300 microns with a mean of about 50 to about 75 microns and median size from 40 to about 60 microns and surface capable of oil absorption/retention.

In some instances, a portion of the anti-wear/anti-galling agent may be present during preparation of the calcium sulfonate grease.

The valve leaking repair packing material may further include a plasticizing agent which is miscible with the calcium sulfonate complex grease. The plasticizing agent may be miscible with the calcium sulfonate complex grease as the ester of the base fluid is miscible with the plasticizing agent.

The plasticizing agent enhances the chemical resistance of the calcium sulfonate complex grease. Further, the plasticizer enables adhesion of components of the valve leaking repair packing during compounding with the calcium sulfonate complex grease. The ester oil provides the solubility parameters to enable incorporation of the plasticizing agent into the composition during compounding. Without the plasticizer the valve leaking repair packing lacks good adhesive properties and renders inadequate lubrication at temperatures above 300° F. under slow movement or high load applications due to thinning.

The plasticizer is preferably a reaction product of an isocyanate and castor oil or a diglycol ester of a dibasic acid.

In an exemplary embodiment, the plasticizer is a polymerized castor oil comprising the reaction product of castor oil and a diisocyanate. The ester in the valve packing repair material enables the plasticizer to be used as a component of the valve leaking repair packing. The plasticizer provides the requisite chemical resistance to the valve leaking repair packing and further enables the requisite adhesive qualities.

While the ester of the valve repair packing composition is typically a component of the calcium sulfonate complex grease with the PAO (and in some cases a small portion of a petroleum or other fluid), in some instances, such as where the thickness of the calcium sulfonate complex grease is sufficient without it, the ester may be added as a component of the valve leak repair packing material as a separate component (along with the anti-wear/anti-galling agent and plasticizing agent) (post the formation and/or addition of the calcium sulfonate grease). In such instances, the ester or other polar fluid may be added as a miscibility enhancer to enable the miscibility of the calcium sulfonate complex grease with the plasticizer but not result in the breakdown or solubilizing the thickener in the base fluid matrix. When the ester is a component of the valve repair packing material, but not the calcium sulfonate complex grease, the amount of ester in the valve repair packing material may range from about 5 to about 20 weight percent.

The presence of the ester in the valve packing material fluid enables solubility of other functional additives, such as antioxidants, hydrogen sulfide scavengers, etc. which may be optionally added when desired.

In an embodiment, the diisocyanate is an arylene diisocyanate such as tolylene diisocyanate (TDI). The TDI may range from about 2 parts to about 14, preferably from 7 to about 11, parts by weight based on the combined weight of the isocyanate and castor oil.

While TDI is preferred, other arylene diisocyanates may be also be used, such as those of the benzene and naphthalene series like m-phenylene diisocyanate, 1-chlorophenylene-2,4-diiscoayanate, xenylene-4,4'-diisocyanate, naphthalene-1,5-diisocyanate. Such plasticizers include those set forth in U.S. Pat. No. 3,262,952, herein incorporated by reference.

In addition, the plasticizer may be a diglycol ester of a dibasic acid. Typical examples are the following compounds: benzenepolycarboxylic acids and their derivatives, such as, for example: monomethyl terephthalate, dimethyl terephthalate, diethyl terephthalate, di-n-propyl terephthalate, di-n-butyl terephthalate, di-tert-butyl terephthalate, diisobutyl terephthalate, monoglycol ester of terephthalic acid, diglycol ester of terephthalic acid, di-n-octyl terephthalate, diisooctyl terephthalate, mono-2-ethylhexyl terephthalate, di-2-ethylhexyl terephthalate, di-n-nonyl terephthalate, diisononyl terephthalate, di-n-decyl terephthalate, di-n-undecyl terephthalate, diisodecyl terephthalate, diisododecyl terephthalate, di-n-octadecyl terephthalate, diisooctadecyl terephthalate, di-n-eicosyl terephthalate, monocyclohexyl terephthalate and/or dicyclohexyl terephthalate. Phthalic esters such as, for example: monomethyl phthalate, dimethyl phthalate, diethyl phthalate, di-n-propyl phthalate, di-n-butyl phthalate, di-tert-butyl phthalate, diisobutyl phthalate, monoglycol ester of phthalic acid, diglycol ester of phthalic acid, di-n-octyl phthalate, diisooctyl phthalate, di-2-ethylhexyl phthalate, di-n-nonyl phthalate, diisononyl phthalate, di-n-decyl phthalate, diisodecyl phthalate, di-n-undecyl phthalate, diisododecyl phthalate, di-n-octadecyl phthalate, diisooctadecyl phthalate, di-n-eicosyl phthalate, monocyclohexyl phthalate, dicyclohexyl phthalate; alkyl isophthalates such as monomethyl isophthalate, dimethyl isophthalate, diethyl isophthalate, di-n-propyl isophthalate, di-n-butyl isophthalate, di-tert-butyl isophthalate, diisobutyl isophthalate, monoglycol ester of isophthalic acid, diglycol ester of isophthalic acid, di-n-octyl isophthalate, diisooctyl isophthalate, di-2-ethylhexyl isophthalate, di-n-nonyl isophthalate, diisononyl isophthalate, di-n-decyl isophthalate, diisodecyl isophthalate, di-n-undecyl isophthalate, diisododecyl isophthalate, di-n-octadecyl isophthalate, diisooctadecyl isophthalate, di-n-eicosyl isophthalate, monocyclohexyl isophthalate and/or dicyclohexyl isophthalate.

In an embodiment, the valve leaking repair packing may be prepared by first combining the calcium sulfonate complex grease with an anti-wear/anti-galling agent. In the Examples follows, the anti-wear/anti-galling agent added to the calcium sulfonate complex grease is an expanded and antioxidant treated graphite. In a second step, additional anti-wear/anti-galling agent (such as conventional graphite) may be added with the plasticizer. After mixing, the binding/thickening agent may be added, followed by the mixing of additional anti-wear/anti-galling agent. Additional binding/thickening agent may then be added and mixed. The incremental additions of anti-galling agent and binding/thickening agent keeps the mixer from overheating and further ensures the components of the repair packing are both uniform and of sufficient hardness for both stick extrusion for valve packing regeneration.

Valves repaired with the repair packing disclosed herein satisfy the requirements of API 624 (Type Testing of Rising Stem Valves Equipped with Graphite Packing for Fugitive Emissions) in not exceeding fugitive emissions in excess of 100 ppm methane ("low emission") (API 624 consisting of 310 mechanical cycles, 3 thermal cycles from ambient to 500° F.). Upon replacement of a leaking stem valve, fugitive emissions are typically no greater than 2 ppm. The valve repair packing composition may thus be characterized as a low emission replacing packing material.

The valve repair packing composition may be used to repair a leaking valve without interrupting the flow of fluids through or into the conduit which the valve stem controls. The procedure is especially effective when the need exists to tap into lines or vessels containing hydrocarbons, natural gas, water, steam and heavy oil products. Use of the valve leaking repair packing may proceed without any downtime of the refinery, conduit which the valve stem controls, or any equipment used at the site of operation. Using a drill and tap procedure wherein a fitting is tapped into the valve stem and into the packing gland after completion of drilling a hole. The valve repair packing composition is then injected into the fitting into the valve through the hole and into the valve stuffing box (holding the original packing). The valve repair packing composition fills the void between the valve stem and the valve body and realign the original packing material.

The valve repair packing material is not curable. Thus, the composition remains pliable after it is inserted into the valve stem and during the operation of the industrial plant.

Since the repair packing is not curable it can be used repeatedly by adjusting of the valve stem once emissions of VOCs are outside of regulated limits. The valve repair packing composition is adjustable throughout the life of the valve stem since it can be mechanical adjustment.

EXAMPLES

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

Examples 1-6. Preparation of a Valve Leak Repair Composition

About 100 lbs of a calcium sulfonate complex grease of density about 10.2 lbs/gal and having molybdenum disulfide, PAO, an ester and surface modified synthetic graphite (commercially available as 5500 Extreme® All Weather from Jet-Lube, LLC) was mixed with about 15 lbs of an expanded and antioxidant treated flexible graphite (commercially available as APX20 graphite from SGL Carbon) for about 10 minutes in a 25 gallon Ross Double Planetary Mixer to assure homogeneity and provide high pressure boundary lubrication properties. Structure to this product was then provided by mixing to it about 15 pounds of a flexible graphite (commercially available as APX2@ graphite from SGL Carbon) for about 10 minutes in a 25 gallon Ross Double Planetary Mixer to assure homogeneity and provide high pressure boundary lubrication properties. Structure to this product was then provided by mixing to it about 15 pounds of amorphous graphite (commercially from Asbury Graphite Mills, Inc as Asbury 505). About 6 lbs, 8 ounces of castor oil type polymer (commercially available as Vorite 125 from Vertellus Vorite) was then added and mixed for about 10 minutes until homogeneous. About 13 pounds of silica (commercially available as Cabosil M-5 from Cabot Industries) was then added and mixed for about 10 minutes until homogeneous. About 14 pounds of Asbury 505 graphite was then was added and mixed for about 10 minutes until homogeneous. About 6.75 pounds of Cabosil M-5 silica was then added and mixed for 10 minutes until homogeneous.

The mixture was then extruded in a stick form while still warm, the dimensions of the stick set forth in Table II:

TABLE II

| Ex. No. | Diameter, inches | Length, inches |
|---|---|---|
| 1 | 3/8 | 1 1/2 |
| 2 | 7/16 | 2 1/8 |
| 3 | 1/2 | 2 1/4 |
| 4 | 5/8 | 3 1/2 |
| 5 | 1 3/8 | 8 1/2 |
| 6 | 1 1/2 | 10 1/2 |

Each of the extruded sticks exhibited a cone penetration value of from 75 to 100, ASTM D217. Further, all of the extruded sticks exhibited emissions of both VOCs and other chemicals under 11 parts per million (ppm) in testing in refineries as well as API 624 (Type Testing of Rising Stem Valves Equipped with Graphite Packing for Fugitive Emissions).

Comparative Example 7. Preparation of a Valve Leak Repair Composition

About 100 lbs of a calcium sulfonate complex grease of density about 10.2 lbs/gal and having molybdenum disulfide and surface modified synthetic amorphous graphite (commercially available as 5500 Extreme® All Weather from Jet-Lube, LLC) was mixed with about 15 lbs of a flexible graphite (commercially available as APX28 graphite from SGL Carbon) for about 10 minutes in a 25 gallon Ross Double Planetary Mixer to assure homogeneity and provide high pressure boundary lubrication properties. Structure to this product was then provided by mixing to it about 15 pounds of amorphous graphite (commercially from Asbury Graphite Mills, Inc as Asbury 505). About 13 pounds of silica (commercially available as Cabosil M-5 from Cabot Industries) was then added and mixed for about 10 minutes until homogeneous. About 14 pounds of Asbury 505 graphite was then was added and mixed for about 10 minutes until homogeneous. The mixture was then extruded in a stick form while still warm. The sticks were softer than those of the above Examples of approximately exhibited cone penetration, ASTM D-217, of 130 mm×10$^{-1}$ and did not hold up in the valve stem packing. The presence of the plasticizer in Examples 1-6 improved adhesiveness and fluid film properties at elevated temperatures over the composition of Example 7.

Example 8. Preparation of a Valve Leak Repair Composition

About 32 lbs of a calcium sulfonate complex grease thickening a blend of fatty acid polyol ester and PAO of density about 8.4 ppg and having calcium carbonate and other calcium salts (commercially available as Actuator Grease from Jet-Lube, LLC) was then added to 27 pounds 10 cSt PAO followed by the addition of about 3% molybdenum disulfide (commercially available from Climax Molybdenum as MoS2 Tech grade) and surface modified synthetic graphite mixed with about 15 lbs of APX20 graphite, about 5 pounds calcium carbonate (commercially available Omyacarb 3-AZ) and about 4 pounds of magnesium hydroxide (commercially available from Marshall Additive Technologies HTMB4) and mixed for 10 minutes until homogeneous in a 25 gallon Ross Double Planetary Mixer to assure homogeneity and provide high pressure boundary lubrication properties. Structure to this product was then provided by mixing to it about 15 pounds of Asbury 505. About 6 lbs, 8 ounces of Vorite 125 was then added and mixed for about 10 minutes until homogeneous. About 20 pounds of silica (commercially available as Aerosil 200 from Evonik) was then added and mixed for about 10 minutes until homogeneous. About 14 pounds of Asbury 505 graphite was then was added and mixed for about 10 minutes until homogeneous.

Examples 9-13. Preparation of Valve Leak Repair Compositions

To about 100 lbs of a calcium sulfonate complex grease of density about 8.8 ppg and having calcium carbonate and other calcium salts (commercially available as Matrix EP 1 from Whitmore Manufacturing) was added Climax Molybdenum as MoS2 with about 3% and surface modified synthetic graphite was mixed with about 15 lbs of a APX2@ graphite and for about 10 minutes in a 25 gallon Ross Double Planetary Mixer to assure homogeneity and provide high pressure boundary lubrication properties. Structure to this product was then provided by mixing to it about 15 pounds of Asbury 505. About 6 lbs, 8 ounces of diglycol dibasic acid polymer (commercially available as Edenol 9790 from Emery Oleochemicals or Paraplex P-7092 from Halstar Chemical) was then added and mixed for about 10 minutes until homogeneous. About 20 pounds of Aerosil R-972 silica was then added and mixed for about 10 minutes until homogeneous. About 14 pounds of Asbury 505 graphite was then was added and mixed for about 10 minutes until homogeneous. About 4 pounds of zinc oxide from Zochem was then added and mixed for 10 minutes until homogeneous.

The mixture was then extruded in a stick form while still warm, the dimensions of the sticks set forth in Table II above.

Example 14. Use of Valve Leak Repair Composition as an Injectable Valve Packing Composition The extruded stick of Ex. No. 5 was used as an injectable valve packing composition after creating a simulated packing leak.

The following steps were first undertaken to create a used valve/failed packing using a commercial packing or OEM valve composition to represent in-situ use of the injectable valve packing composition. First, a valve containing the OEM composition was subjected to 100 mechanical cycles at ambient temperature with no application of pressure. A failed packing scenario was simulated by replacing the commercial packing with flexible graphite valve packing (commercially available as Teadit® 2235 from Teadit North America) and 40 ft-lbs torque was applied. The valve was then subjected to API 624 test procedure (310 mechanical cycles with 3 thermal cycles, under 600 psi methane). The final torque was found to be 24 ft-lbs on the packing and the packing did not leak above the maximum allowable leakage of 100 ppm, API 624.

Creation of a packing leak was then attempted prior to injecting the stuffing box with the test material. The packing torque was reduced from 24 ft-lbs to 20 ft-lbs and then stroked 5 times while under 600 psi methane. A sniff was taken on the stem seals and the packing were still found to be within acceptable API 624 standards (less than 100 ppm). The packing torque was then reduced from 20 ft-lbs to 15 ft-lbs and then stroked five times while under 600 psi methane. A sniff was taken on the stem seals and the packing was still within the acceptance criteria of API 624 (less than 100 ppm). The packing torque was then reduced from 20 ft-lbs to less than 5 ft-lbs and stroked five times while under 600 psi methane. A sniff was taken on the stem seals and the packing was above the allowable leakage rate of API 624 (greater than 100 ppm).

The injectable valve packing extrudate of Example 5 was then injected into the valve. A packing torque was then increased to 30 ft-lbs. The valve was then subjected to five cycles under 600 psi methane and the torque was then re-checked to verify the packing was consolidated. The packing was then adjusted back to 30 ft-lbs and the sequence was then repeated until the packing load maintained 30 ft-lbs at the packing gland. A total of three adjustments (15 cycles) were performed before the packing maintained the 30 ft-lbs load. The tested packing was then subjected to the test temperatures, pressures, and total mechanical cycles as specified in API 624. The test results are set forth in Table III wherein the valve was cooled down to ambient temperatures between each of the four thermal cycles:

TABLE III

| Thermal Cycle | Valve Temperature | Cycle Segment | TC1 (Bonnet) °F. | TC2 (Body) °F. | Packing leakage (ppm) Static | Packing leakage (ppm) Dynamic |
|---|---|---|---|---|---|---|
| 1 | Ambient | 0 | 86 | 86 | 0 | |
|   |         | 50 | 104 | 103 | 0 | 1 |
|   | Thermal | 51 | 479 | 501 | 0 | |
|   |         | 100 | 489 | 503 | 0 | 0 |
| 2 | Ambient | 101 | 85 | 85 | 0 | |
|   |         | 150 | 109 | 103 | 0 | 0 |
|   | Thermal | 151 | 476 | 496 | 5 | |
|   |         | 200 | 478 | 502 | 0 | 0 |
| 3 | Ambient | 201 | 87 | 88 | 5 | |
|   |         | 250 | 110 | 93 | 1 | 15 |
|   | Thermal | 251 | 476 | 493 | 8 | |
|   |         | 300 | 481 | 504 | 9 | 11 |
| 4 | Ambient | 301 | 98 | 98 | 2 | |
|   |         | 310 | 101 | 98 | 1 | 5 |
|   | Average |   |   |   | 2.2 | 4.6 |

Table III demonstrates packing with the extrudate satisfied the requirements of API 624 in not exceeding 100 ppm methane criteria.

Embodiment 1

A valve packing composition comprising (a) a calcium sulfonate complex grease comprising at least one polyalphaolefin and at least one ester; (b) at least one anti-wear/anti-galling agent; (c) at least one binding/thickening agent; and (d) a plasticizing agent miscible with the ester of the calcium sulfonate complex grease.

Embodiment 2

The valve packing composition of embodiment 1, wherein the ester is miscible with the plasticizing agent.

Embodiment 3

The valve packing composition of embodiment 1 or 2, wherein the plasticizing agent is miscible with the calcium sulfonate complex grease.

Embodiment 4

The valve packing composition of any of embodiments 1 to 3, wherein the calcium sulfonate complex grease comprises between from about 60 to about 95% by weight of the at least one polyalphaolefin and at least one ester.

Embodiment 5

The valve packing composition of any of embodiments 1 to 3, comprising (a) from about 20 to about 60 w/w % of the calcium sulfonate complex grease; (b) from about 20 to about 50 w/w % of the anti-wear/anti-galling agent; (c) from about 5 to about 20 w/w % of the binding/thickening agent; and (d) from about 2 to about 20 w/w % of the plasticizing agent.

Embodiment 6

The valve packing repair composition of embodiment 5, comprising (a) from about 30 to about 60 w/w % of the calcium sulfonate grease complex; (b) from about 30 to about 50 w/w % of the anti-wear/anti-galling agent; (c) from about 5 to about 15 w/w % of the binding/thickening agent; and (d) from about 2 to about 10 w/w % of the plasticizing agent.

Embodiment 7

The valve packing repair composition of embodiment 6, comprising (a) from about 35 to about 45 w/w % of the calcium sulfonate grease complex; (b) from about 40 to about 45 w/w % of the anti-wear/anti-galling agent; (c) from about 10 to about 15 w/w % of the binding/thickening agent; and (d) from about 2 to about 8 w/w % plasticizing agent;

Embodiment 8

The valve packing composition of any of embodiments 1 to 7, wherein the calcium sulfonate complex grease comprises calcium sulfonate in a base oil consisting essentially of at least one polyalphaolefin and at least one ester.

Embodiment 9

The valve packing composition of any of embodiments 1 to 8, wherein the calcium sulfonate complex grease comprises micellular calcium sulfonate particles in a base oil comprising the at least one polyalphaolefin and the at least one ester.

Embodiment 10

A valve packing composition comprising (a) a calcium sulfonate complex grease comprising at least one polyalphaolefin; (b) at least one anti-wear/anti-galling agent; (c) at least one binding/thickening agent; (d) an ester; and (f) a plasticizing agent.

Embodiment 11

The valve packing composition of embodiment 10, wherein the plasticizing agent is miscible with the ester.

Embodiment 12

The valve composition of embodiment 10 or 11, wherein the calcium sulfonate complex grease comprises micellular calcium sulfonate particles in a base oil comprising the at least one polyalphaolefin.

Embodiment 13

The valve packing composition of any of embodiments 1 to 12, wherein the at least one polyalphaolefin has a viscosity of 8 to 60 centistokes at 100° C.

Embodiment 14

The valve packing composition of any of embodiments 1 to 13, wherein the at least one polyalphaolefin is selected from the group consisting of polyethylenes, polypropylenes, polybutenes, polypentenes, polyhexenes and polyheptenes.

Embodiment 15

The valve packing composition of any of embodiments 1 to 14, wherein the at least one ester is an ester of a diol or polyol having from about 3 to about 20 hydroxyl groups and an aliphatic acid having from about 1 to about 24 carbon atoms.

Embodiment 16

The valve packing composition of any of embodiments 1 to 15, wherein the plasticizing agent is an isocyanate reaction product of castor oil or a diglycol ester of a dibasic acid.

Embodiment 17

The valve packing composition of embodiment 16, wherein the diisocyanate is an arylene diisocyanate.

Embodiment 18

The valve packing composition of embodiment 17, wherein the arylene diisocyanate is tolylene diisocyanate.

Embodiment 19

The valve packing composition of any of embodiments 1 to 18, wherein the anti-wear/anti-galling agent is selected from the group consisting of graphite, antioxidant treated flexible graphite, molybdenum disulfide, tungsten disulfide, mineral carbonates, mineral silicates, mineral fluorides, mineral oxides and combinations thereof.

Embodiment 20

The valve packing composition of embodiment 19, wherein the anti-wear/anti-galling agent is selected from the group consisting of graphite, molybdenum disulfide, zinc oxide, magnesium oxide, magnesium hydroxide, expanded graphite, flake graphite.

Embodiment 21

The valve packing composition of any of embodiments 1 to 20, wherein the binding/thickening agent is selected from the group consisting of silica, organophilic clay, powdered metallic soaps and combinations thereof.

Embodiment 22

The valve packing composition of embodiment 21, wherein the binding/thickening agent is silica.

Embodiment 23

The valve packing composition of any of embodiments 1 to 22, wherein the dropping point of the valve packing composition is greater than 500° F., ASTM D-2265.

Embodiment 24

The valve packing composition of any of embodiments 1 to 23, wherein the penetration index is from about 75 to about 95 at 77° F., ASTM-D-217.

Embodiment 25

The valve packing composition of any of embodiments 1 to 24, wherein the calcium sulfonate complex grease further comprises a lubricating oil selected from the group consisting of a petroleum-based oil, mineral oil or a vegetable oil or a combination thereof.

Embodiment 26

The valve packing composition of any of embodiments 1 to 25, wherein the valve packing composition is not curable.

Embodiment 27

A method of repairing a leaking valve stem comprising (a) drilling and tapping into the leaking valve stem; (b) injecting the composition of any of embodiments 1 to 26 into the valve stem; and (c) closing the valve stem.

What is claimed is:

1. A method of repairing a leaking valve stem comprising:
    (a) drilling and tapping into the leaking valve stem; and
    (b) injecting into the valve stem a composition comprising:
        (i) a calcium sulfonate complex grease comprising at least one polyalphaolefin and at least one ester:
        (ii) at least one anti-wear/anti-galling agent;
        (iii) at least one binding/thickening agent; and
        (iv) a plasticizing agent miscible with the ester of the calcium sulfonate complex grease; and
    (c) closing the valve stem.

2. The method of claim 1, wherein the ester of the base oil is miscible with the plasticizing agent.

3. The method of claim 1, wherein the plasticizing agent is miscible with the calcium sulfonate complex grease.

4. The method of claim 1, wherein the calcium sulfonate complex grease comprises between from about 60 to about 95% by weight of the at least one polyalphaolefin and at least one ester.

5. The method of claim 1, wherein the composition comprises:
    (a) from about 20 to about 60 w/w % of the calcium sulfonate complex grease;
    (b) from about 20 to about 50 w/w % of the anti-wear/anti-galling agent;
    (c) from about 5 to about 20 w/w % of the binding/thickening agent; and
    (d) from about 2 to about 20 w/w % of the plasticizing agent.

6. The method of claim 1, wherein the calcium sulfonate complex grease comprises micellular calcium sulfonate particles in a base oil comprising the at least one polyalphaolefin and the at least one ester.

7. The method of claim 1, wherein the at least one polyalphaolefin has a viscosity of 8 to 60 centistokes at 100° C.

8. The method of claim 1, wherein the at least one polyalphaolefin is selected from the group consisting of polyethylenes, polypropylenes, polybutenes, polypentenes, polyhexenes and polyheptenes.and/or the at least one ester is an ester of a diol or polyol having from about 3 to about 20 hydroxyl groups and an aliphatic acid having from about 1 to about 24 carbon atoms.

9. The method of claim 1, wherein the plasticizing agent is an isocyanate reaction product of castor oil or a diglycol ester of a dibasic acid.

10. The method of claim 1, wherein the anti-wear/anti-galling agent is selected from the group consisting of graphite, engineered graphite, molybdenum disulfide, tungsten disulfide, mineral carbonates, mineral silicates, mineral fluorides, mineral oxides and combinations thereof.

11. The method of claim 1, wherein the binding/thickening agent us selected from the group consisting of silica, organophilic clay, powdered metallic soaps and combinations thereof.

12. The method of claim 1, wherein the dropping point of the valve packing composition is greater than 500° F., ASTM D-2265.

13. The method of claim 1, wherein the penetration index is from about 75 to about 95 at 77° F., ASTM -D-217.

14. The method of claim 1, wherein the calcium sulfonate complex grease further comprises a lubricating oil selected from the group consisting of petroleum-based oil, mineral oil or a vegetable oil or a combination thereof.

15. The method of claim 1, wherein the composition is incurable.

16. A method of repairing a leaking valve stem comprising:
    (a) drilling and tapping into the leaking valve stem;
    (b) injecting into the valve stem an incurable composition comprising:
        (i) a calcium sulfonate complex grease comprising at least one polyalphaolefin;
        (ii) at least one anti-wear/anti-galling agent
        (iii) at least one binding/thickening agent;
        (iv) an ester; and
        (v) a plasticizing agent; and
    (c) closing the valve steam stem.

17. The method of claim 16, wherein the plasticizing agent is miscible with the ester.

18. The method of claim 16, wherein the calcium sultanate complex grease comprises micellular calcium sultanate particles in a base oil comprising the at least one polyalphaolefin.

19. The method of claim 16, wherein:
    (a) the at least one polyalphaolefin is selected from the group consisting of polyethylenes, polypropylenes, polybutenes, polypentenes, polyhexenes and polyheptenes;
    (b) the at least one ester is an ester of a diol or polyol having from about 3 to about 20 hydroxyl groups and an aliphatic acid having from about 1 to about 24 carbon atoms;
    (c) the plasticizing agent is a reaction product of castor oil and a or a diglycol ester of a dibasic acid; and/or
    (d) the anti-wear/anti-galling agent is selected from the group consisting of graphite, engineered graphite, molybdenum disulfide, tungsten disulfide, mineral carbonates, mineral silicates, mineral fluorides, mineral oxides and combinations thereof.

20. The method of claim 16, wherein the penetration index is from about 75 to about 95 at 77° F., ASTM -D-217.

* * * * *